(12) United States Patent
Clawson, Jr. et al.

(10) Patent No.: US 11,957,126 B2
(45) Date of Patent: Apr. 16, 2024

(54) GRANULATED AGRICULTURAL ADJUVANT AND METHOD OF MAKING AND USING SAME

(71) Applicant: KOP-COAT, INC., Pittsburgh, PA (US)

(72) Inventors: Ronald W. Clawson, Jr., Trafford, PA (US); Bruce W. Dawson, Williamstown (AU); Saddam Hussain, Truganina (AU)

(73) Assignee: KOP-COAT, INC., Pittsburgh, PA (US)

( * ) Notice: Subject to any disclaimer, the term of this patent is extended or adjusted under 35 U.S.C. 154(b) by 370 days.

(21) Appl. No.: 16/058,038

(22) Filed: Aug. 8, 2018

(65) Prior Publication Data

US 2020/0045960 A1  Feb. 13, 2020

(51) Int. Cl.
*A01N 25/12* (2006.01)

(52) U.S. Cl.
CPC .................................. *A01N 25/12* (2013.01)

(58) Field of Classification Search
CPC ......... A01N 25/00; A01N 25/12; A01N 25/30
USPC ....................................................... 504/367
See application file for complete search history.

(56) References Cited

U.S. PATENT DOCUMENTS

| 5,045,366 | A | 9/1991 | Sedun |
| 5,656,572 | A | 8/1997 | Kuchikata et al. |
| 6,797,277 | B2 | 9/2004 | Heier et al. |
| 2002/0006874 | A1 | 1/2002 | Brigance et al. |
| 2004/0058821 | A1 | 3/2004 | Brigance et al. |
| 2004/0063582 | A1 | 4/2004 | Johnson |
| 2010/0093544 | A1* | 4/2010 | Park .................. A01N 25/30 504/367 |
| 2013/0079228 | A1* | 3/2013 | Freed .................. A01N 25/02 504/206 |
| 2017/0166488 | A1* | 6/2017 | Chaudhry ............... C05B 15/00 |

FOREIGN PATENT DOCUMENTS

| AU | 2010277784 A1 | 2/2012 |
| CN | 103111101 A | 5/2013 |
| WO | WO9702742 A1 | 1/1997 |
| WO | WO2014207696 A1 | 12/2014 |
| WO | WO2018073085 A1 | 4/2018 |

OTHER PUBLICATIONS

Alphaken Pty Ltd .; Kombo 950 Technical Manual 2017; registered trademark of BD Chemicals Pty Ltd.
Wilber-Ellis Company LLC .; Bronc Plus Dry-EDT (Commerical product description); registered trademark of Wilber-Ellis Company.
International Search Report of the Patent Cooperation Treaty—dated Nov. 1, 2019.
Extended European Search Report of EP19848217.6, dated Mar. 28, 2022.

* cited by examiner

*Primary Examiner* — Zohreh A Fay
(74) *Attorney, Agent, or Firm* — Debora Plehn-Dujowich; Eckert Seamans Cherin and Mellott, LLC (57) ABSTRACT

A granulated defoamer has a dry ammonium sulfate which has been combined with a mixture of at least two of the following materials, anionic surfactant, an organic acid and a defoamer. The method of creating the granulated defoamer and method of using the same in agricultural spraying of vegetation.

7 Claims, 2 Drawing Sheets

GRANULATED AGRICULTURAL ADJUVANT AND METHOD OF MAKING AND USING SAME

BACKGROUND OF THE INVENTION

1. Field of the Invention

The present invention is directed toward a water soluble solid granulated adjuvant which contains ammonium sulfate and is combined with other ingredients including a defoamer. The granular product is dissolved in water which has or will have one or more dissolved pesticides. This is done in order to resist undesired foaming and to enhance the delivery and performance of the pesticide. It is also directed toward a method of the making of the solid adjuvant, and the method of using the solid adjuvant.

2. Description of the Prior Art

Adjuvants are inert substances that are added to a pesticide product or pesticide tank formulations to enhance the performance and/or the physical properties of the pesticide formulation. Known examples of adjuvants include surfactants, crop oils, drift reduction agents, deposition control agents, thickeners, water conditioners, compatibility aids, cleaners, and defoaming/anti-foam agents.

Unlike the pesticides that are utilized in the agricultural industry, the adjuvants that are chosen to accompany them in formulations have no protective properties against nuisance pests. Their sole function is to improve a product performance limitation that comes with the generic pesticide product or pesticide formulation. These limitations are not planned, but emerge due to localized differences in the biological and environmental factors that impact where agriculturally important products are grown.

A major problem with water-based pesticide formulations is their propensity to generate foam in the mix/holding tanks of their application equipment. Typically, this is due to the high loadings of surfactants, which may be either included in the pesticide formulation or tank-added as an adjuvant. They are utilized to improve the overall pesticide formulation stability and/or improve liquid uptake (absorption) on the plant. The continued global development of tank-add adjuvants for use with pesticide formulations has perpetuated the aggressive use of surfactants and other foam-generating co-formulants. With this trend, the use of tank-added defoamers/anti-foam agents continues to increase. Common defoamer/anti-foam agents include, for example, water-insoluble oils, polydimethylsiloxanes, silicones, aliphatic long-chain alcohols, stearates and glycols. Typically, this use requires the pesticide applicator such as a farmer, a forester, an arborist or others involved in the preparation and application of a stand-alone dose of a liquid defoamer/anti-foam agent to add a separate defoamer/antifoam agent to the pesticide solution in order to control foam.

Few formulated liquid adjuvants include a defoamer/anti-foam agent due to formulation compatibility issues in making a stable, water-diluted concentrated adjuvant product. Even fewer adjuvants are solid, granulated products that are designed to be dissolved in the water used to dilute the pesticide product. Unfortunately, most high-performance defoamers/anti-foams are liquid based products. There are a very limited number of commercially available solid defoamers/anti-foam products, but their performance is orders of magnitude less when compared in a standard foam prevention or foam knock-down test. As a result, the need to use significantly higher use rates make the use of solid defoamers/anti-foam agents complicate the elegantly simple solid formulations.

U.S. Published Patent Application 2004/0063582 discloses a Seed Treatment Composition and Method of Treating Seed by creating and applying a liquid based formulation requires a large number of ingredients. They include macronutrients, micronutrients, a pest inhibitor, vitamin/cofactor, coenzyme, an amino acid, and a growth regulator. A liquid based defoamer which is incorporated into the multi-component liquid concentrate, which may contain ammonium sulfate. Once the liquid is added to the seed, a drying process is employed to dry the formulation on the article through removal of water. There is no reference to a solid-based formulation.

U.S. Pat. No. 6,797,277 is directed toward a delivery system for pesticides and crop yield enhancement products It employs microencapsulated active ingredients in extruded granules. The granules are said to contain at least one active chemical ingredient, a solid carrier and a binder. The chemical ingredient may or may not be micro-encapsulated with the binder being added directly to the composition or applied as a coating to the granules after the extrusion process. These are to be distributed to a crop field by aerial means and are said to be water dispersible to effect dispersion of the chemical ingredient.

A product sold under the trade designation BRONCO® PLUS DRY-EDT by Wilbur-Ellis is said to provide a dry, water soluble blend of ammonium sulfate, nonionic surfactant, deposition aid and antifoam agent. The principal functioning agents are said to include ammonium sulfate, carbonyl diamine, polyoxyehethylene-polyoxypropylene, beta-Hydroxy-tricarboxylic acid, polycrylamide polymer and dimethylsiloxane. It is said to improve the efficacy of Glyphosate-based herbicides, such as Round-Up, and other post emergent herbicides. The ammonium sulfate is present in a very small amount which is substantially lower than that of the present invention. It is said to reduce tank mix antigonism. It states that the screen size of the nozzle employed should be no finer than 50 mesh.

A product sold under the trade designation KOMBO 950 is said to be a Glyphosate adjuvant. It contains refined ammonium sulfate, carboxylic acid, a complex carbohydrate polymer and a wetting agent. These four components are said to provide respectively simulation herbicide uptake, acidifies alkaline water and assists with herbicide penetration, increases spray droplets size, droplet deposition and retention and improves spray droplet spread. This is said to provide a group of ingredients which are introduced as separate items into water containing the herbicide Glyphosate.

The incorporation of liquid defoamers/anti-foam agents into solid, granular adjuvant products comes with numerous hurdles that include: general incompatibility, clumping/agglomeration of the granular product, use of a thickening agent, use of an adhesion medium, product discoloration, complicated dry mixing, aggressive drying schedules, post-formulation particle sizing, and limited storage condition in regard to humidity and temperature.

Despite the foregoing known systems, there is lacking an effective means of efficiently resisting the undesired formation of foam in a sprayable liquid which contains a pesticide.

SUMMARY OF THE INVENTION

For simplicity of reference herein, the term "defoamer" will be used interchangeably with "defoamer/anti-foam" and shall be used to refer to a material which resists the formation of foam and/or one which will destroy existing foam.

The above need has been satisfied by the present invention which provides a solid material which in a preferred embodiment incorporates ammonium sulfate, and other ingredients including a solid granulated adjuvant defoamer. In a preferred approach, it is produced in granular form for ease of distribution in water in which it is soluble. The formulation preferably contains a surfactant, a moisture uptake regulator, a defoamer, and an organic acid-based scale inhibitor or water softener.

In one preferred embodiment, the granulated adjuvant will have a maximum size of up to about 5 mm. The ammonium sulfate is preferably pre-screened to less than or equal to 3.5 mm and the granulated adjuvant will have a size which will permit it to pass through a 5 mm screen.

It is an object of the present invention to provide a system for efficiently distributing one or more pesticides contained within a water solution while resisting undesired foam formation.

It is another object of the present invention to provide such a solid product which contains a defoamer.

It is another object of the present invention to provide a water soluble solid defoamer in granular form.

It is another object of the present invention to provide an efficient means for creating and distributing water soluble solid granular particles which contain ammonium sulfate and a defoamer.

It is yet another object of the present invention to provide such solid defoamers in preportioned packages to dilute a separately provided pesticide in a tank containing a solvent in which both are soluble, such as water.

It is a further object of the invention to provide such a system which enhances product stability or shelf life over a long period of time.

It is yet another object of the present invention to provide such a solid system which will reduce the likelihood of chemical spill during loading.

It is yet another object of the present invention to provide such a system which is simple to employ and economically advantageous.

It is yet another object of the present invention to provide such a solid granular adjuvant which resists undesired agglomeration.

It is a further object of the present invention to provide a method of manufacturing such a granular adjuvant.

It is yet another object of the present invention to provide a method of using such a solid granular adjuvant combination.

These and other objects of the invention will be readily apparent from the description which follows.

DESCRIPTION OF THE PREFERRED EMBODIMENTS

As employed herein, the term "pesticide" shall have its ordinary meaning and shall expressly include, but not to limited to, chemical formulations which function as herbicides, fungicides, algicides, moldicides, and insecticides.

As employed herein, the term "defoamer" means a material which will both resist formation of foam and reduce the amount of existing foam present. The term is also employed to refer to foam inhibitors, foam breakers, as well as defoamer/anti-foam agents.

The present invention involves providing a water soluble solid of granulated material which is an adjuvant containing ammonium sulfate and a defoamer. Among the preferred materials employed in water soluble solid granulated adjuvants are ammonium sulfate and at least one material selected from the group consisting of a defoamer, an anionic surfactant and an organic acid.

Figure 1:
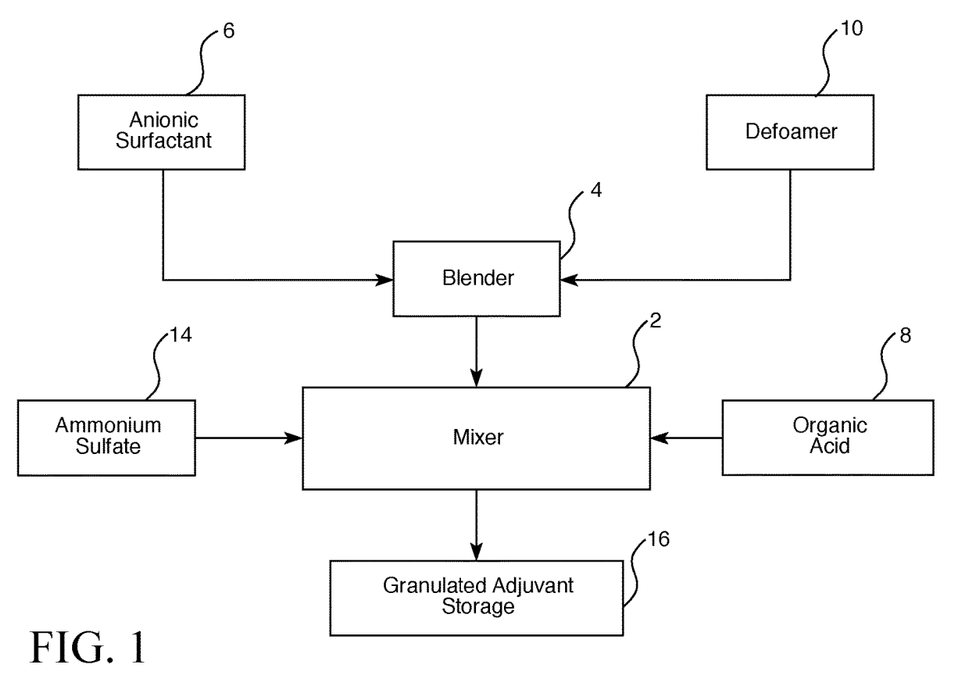
FIG. 1 is a schematic illustration of a method of making the granulated adjuvant of the present invention.

Referring to FIG. 1, there is shown a mixer 2 which is operatively associated with a blender 4, each of which may be a type well known to those skilled in the art for the present purposes. In a preferred sequence, the blender 4 receives and blends an anionic surfactant 6, and a defoamer 10. The output of blender 4 is delivered to mixer 2. To this is added ammonium sulfate 14 and an organic acid. The output from blender 4 is coated and self-bonded onto the ammonium sulfate in mixer 2 to provide the granulated solid dry adjuvant. The blending is generally accomplished at ambient temperature and pressure. The output of mixer 2 is delivered to a granulated adjuvant storage receptacle 16.

Figure 2:
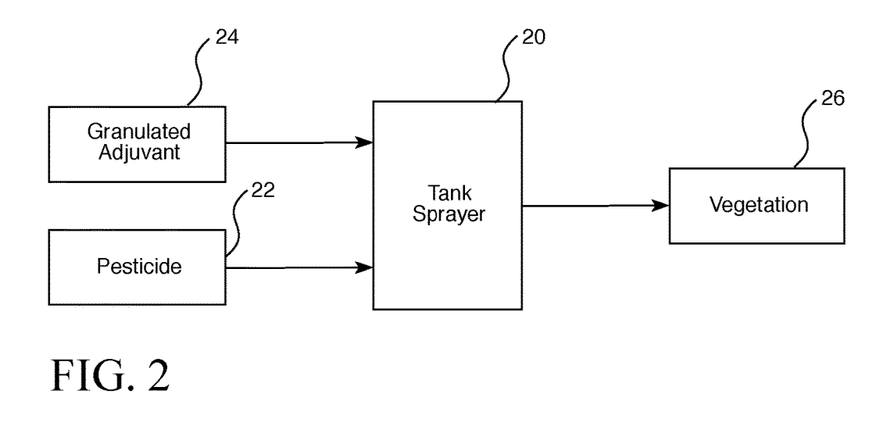
FIG. 2 is a schematic illustration of the combining of the granulated adjuvant and a pesticide or pesticides in a water solution followed by subsequent spray distribution of the same.

Referring to FIG. 2, when it is desired to use the granulated solid adjuvant 24, a tank sprayer 20 which contains a suitable solvent, preferably water, receives a predetermined amount of one or more pesticides 22 and granulated adjuvant 24. At a water temperature above freezing the pesticide 22 and the granulated adjuvant 24 both are dissolved in the water contained in tank sprayer 20 promptly. The amount of foam in tank sprayer 20 having been controlled by the granulated adjuvant, results in the sprayer spraying the pesticide(s) 20 onto the vegetation 26 desired to be protected in an improved manner.

Figure 3:
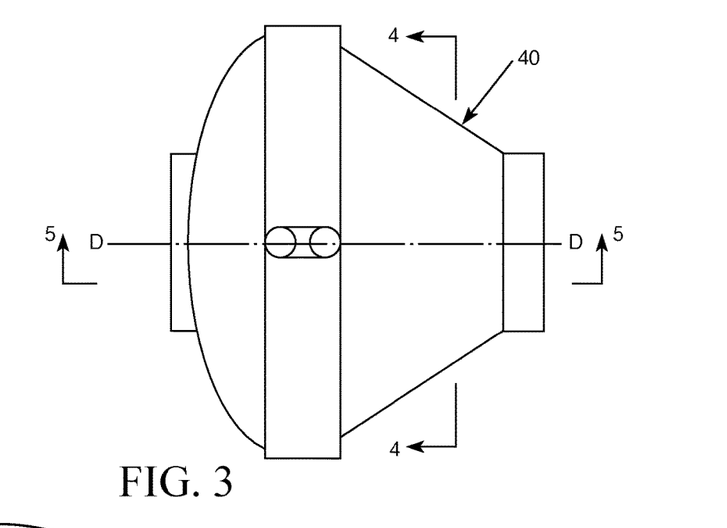
FIG. 3 is a schematic illustration of a rotating drum which is structured to receive ammonium sulfate, a defoamer and other materials employed in creating the solid granular adjuvant.
Figures 4, 5:
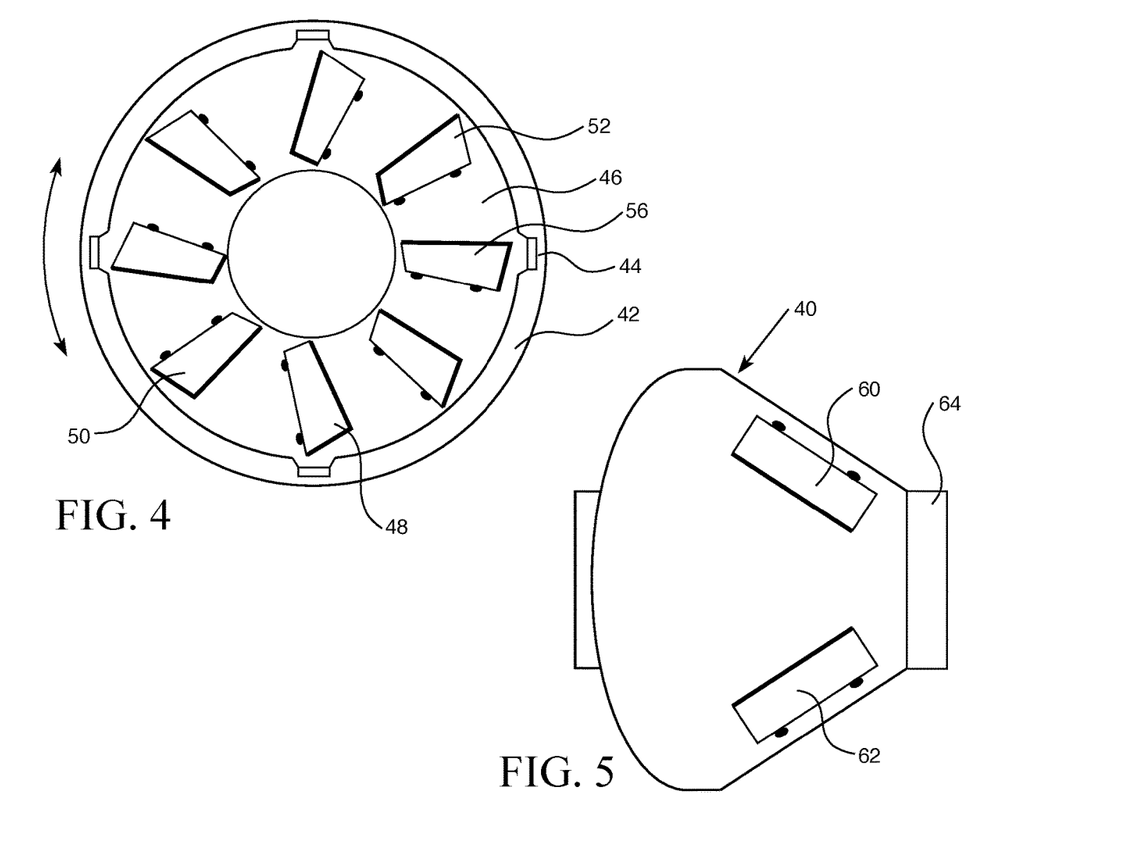
FIG. 4 is a cross-section taken through 4-4 of FIG. 3 of the drum of FIG. 3 showing a portion of the internal drum structure.
FIG. 5 is a longitudinal cross-section of the rotating drum of FIG. 3 taken through 5-5.

FIGS. 3 through 5 show a way of creating the granulated solid adjuvant employing a rotating mixer will be considered. While a number of types of blenders and mixers may be employed to accomplish the objective of creating the granulated solid adjuvant, FIGS. 3 through 5 illustrate a preferred approach. The drum 40 rotates about axis D-D. It has an exterior shell 40 and an appropriate motor and means operatively associated with the drum (not shown) so as to achieve axial rotation at the desired speed.

With reference to FIG. 4, there is shown a hollow annulus 42 which contains an exit nozzle 44 to move air circumferentially within the annulus 42 in order to resist dust entering the mixing chamber 46. A series of baffles such as 48, 50, 52, 56, for example, are positioned within and secured to the interior of the rotating drum. The baffles 48, 50, 52 56 will be so contoured and spaced relative each other and the drum interior surface in a manner well known to those skilled in the art. This serves to create maximum impact between the ammonium sulfate and the defoamer and other materials contained in the adjuvant to enhance the efficiency of the ammonium sulfate being coated by the additional materials.

FIG. 5 shows the generally tapered drum 40 showing examples of baffle 60 and 62 with the inlet 64 through which the materials to be mixed enters.

This process results in the ammonium sulfate granules being coated with the defoamer and other materials. The coating will preferably be substantially continuous and self-adhered to the ammonium sulfate granules.

The Table shows extensive data comparing the efficiency of various formulations in terms of the ammonium sulfate, a surfactant, an organic acid and a defoamer in various concentrations with defoaming action being quantified in the last column.

The Table confirms the efficiency of the various formulations in terms of resisting foaming or destroying foam.

Unless in a specific location it is expressly stated to the contrary, all references to weight percent or % (m/m) refer to weight percent based upon the total solid product. As each formulation was manufactured to 100 grams, mass in grams corresponds to % (m/m). The foam knockdown values are in percent which is the difference between the total foam volume based on the original volume of the foam.

It is preferred that the ammonium sulfate be present in the amount of about 50 to 99.39% (m/m) and preferably, about 97.17 to 98.05% (m/m) and most preferably, about 97.05 to 97.56% (m/m). The ammonium sulfate may have a maximum granular dimension of about 2 to 15 mm and preferably about 2.5 to 5 mm and most preferably about 3.3 mm to 3.5 mm.

The formulation will contain a surfactant such as 80 percent solution dioctyl sulphosuccinate in the amount of about 0.10 to 47.68% (m/m) and preferably about 0.12 to 38.14% (m/m).

The organic acid such as citric acid will be present in the amount of 0.90 to 2.22% (m/m), preferably, 1.32 to 2.22% (m/m) and most preferably about 1.75 to 1.85% (m/m).

The defoamer will preferably be present in an amount from 0.1 to 1.00 weight percent and preferably, about 0.30 to 0.60% (m/m). Among the preferred defoamers are a material selected from the group consisting of emulsified silicone defoamer, polydimethylsiloxane, silicon dioxide and polyether-modified polydimethylsiloxane.

In another embodiment of the invention, the citric acid is eliminated and a successful percent foam inhibition was achieved by substituting at least one material selected from the group consisting of nitrilotriacetic acid (CAS: 139-13-9) ascorbic acid and acetic acid (CAS: 64-19-7). Each of these would be employed in the range of about 0.90 to 2.22 weight percent and preferably about 1.32 to 2.22% (m/m).

The surfactant is selected from the group consisting of doctyl sulphosucciate, sodium lauryl sulfate, sodium laureth-4 and sodium stearate. The surfactant may be present in the amount of about 0.12 to 47.68% (m/m) and preferably about 0.12 to 0.32% (m/m). In a further embodiment, the formulation has been used without the surfactant.

In mixing the composite granules with the water, one would normally rely on the amount of pesticide which would be separately introduced into and dissolved in the water. The adjuvant in terms of quantity introduced into the water may follow generally the amount employed in the prior art practice of being introduced separately into the pump sprayer.

The sprayer may be any conventional agricultural sprayer and may be used in its ordinary manner in distributing the solution containing the adjuvant and the fungicide dissolved in the water.

The present invention has provided a novel solid granular agricultural adjuvant which is combined in a solid containing both ammonium sulfate and a defoamer in addition to other preferred ingredients. It also provides a method for making the same and method for using the same. The resulting formulation produces a free-flowing solid without of any undesired agglomeration with no deleterious effects on long term stability. The material is totally water soluble and exhibits excellent foam prevention and foam destruction properties. The unique and simple solid formulation contains ammonium sulfate, a surfactant, a defoamer and an organic acid based scale inhibitor/water softener.

EXAMPLE

In order to evaluate the method of making the solid defoamer of the present invention, the method of using the same and the effectiveness the results from which are reported in the Table were conducted.

Various defoamers were formulated into the solid formulation. The solids were then dissolved in water and transferred to a graduated cylinder before the addition of a known amount of powerful foaming agents (Barlox 1260, 60% active cocoamine oxide surfactant) which has high foaming properties. The foaming agent was added and the solution was mixed using a mechanical Dispermat according to the previously described conditions. The volume of foam above the liquid interface was measured 1 minute after the mixer was turned off The volume of foam was quantified by simple visual analysis in the graduated cylinder and compared to the volume of foam generated with a negative control. The graduated cylinder had calibrated measurement lines. The results were reported as % Foam Inhibited (compared to the negative control) where 100% was no foam generation and 0% was identical to the volume of foam generated in the negative control.

By way of initial example, the solution of the negative control generated 107 mL of foam under the above foam generating stress conditions. The solid adjuvant formulation with no defoamer, when dissolved in water, and mixed with the foaming agent, produced 101 mL of foam, resulting in a 6% inhibition in the volume of foam generated.

Experimental Method

As described hereinabove and seen in the Table, various defoamers/anti-foam agents were formulated into the solid formulation. The solid products were then dissolved in water and transferred to a graduated cylinder before the addition of a known amount of powerful foaming agents (Barlox 1260, 60% active cocoamine oxide surfactant).

The amount of the solid formulations chosen to be dissolved in water corresponds to common end-use rates of ammonium sulfate in agricultural applications. The amount of the foaming agent and surfactant utilized was chosen based on surfactant loadings commonly seen in water based pesticide formulations. The solution containing the experimental solid formulations and the foam generation agent in water were then mixed under identical and known foam generating conditions (30 seconds at 5000 RPM using a Dissolver Dispermat® CN Lab Dispersion Mixer). The volume of foam could be quantified by simple visual analysis in the graduated cylinder and compared to the volume of foam generated with a negative control. The results were reported as % Foam Inhibited (compared to the negative control) where 100% was no foam generation and 0% was identical to the volume of form generated in the negative control.

In order to assemble the extensive Table which contains data from the testing performed with regard to the present invention, the following assembly may be employed. Each of the pages in pages 11 through 16 have at their margin at least two capital letters contained within parenthesis. If a capital letter on one page is matched to a letter on an adjacent page, the six page Table will be established. For example, the Table portion on page 11 to the right has (A) and page 12, to the left has (A). Those two letters should be positioned adjacent to each other. Similarly, (B) on page 12 should be positioned adjacent to (B) on page 13. This establishes the top three pages in the proper order. Page 14 will have at its upper edge a (C) which matches the lower (C) on page 11. Similarly, the (D) of pages 12 and 15 will match and the (E) of pages 13 and 16 will match. Aligning the pages in this fashion provides the complete Table.

TABLE

Experimental Solid Formulation Specifics, Qualitative Particle Screening of the Formulated Product, and Foam Inhibition Data

| | Ammonium Sulfate (g) | 80% Sodium Dioctyl sulphosuccinate Solution (g) | Citric Acid (g) | Emulsified Silicone Defoamer (g) | Polydimethyl siloxane (g) | Silicon Dioxide (g) | Polyether-modified Polydimethyl-siloxane (g) | |
|---|---|---|---|---|---|---|---|---|
| Control Formulation with No Defoamer | 98.05 | 0.12 | 1.83 | | | | | (A) |
| Formulation 1 | 97.56 | 0.12 | 1.83 | 0.49 | | | | |
| Formulation 2 | 97.56 | 0.12 | 1.83 | | 0.49 | | | |
| Formulation 3 | 97.56 | 0.12 | 1.83 | | | 0.49 | | |
| Formulation 4 | 97.56 | 0.12 | 1.83 | | | | 0.49 | |
| Formulation 5 | 97.95 | 0.12 | 1.83 | 0.1 | | | | |
| Formulation 6 | 97.05 | 0.12 | 1.83 | 1 | | | | |
| Formulation 7 | 50 | 47.68 | 1.83 | 0.49 | | | | |
| Formulation 8 | 98.49 | 0.12 | 0.9 | 0.49 | | | | |
| Formulation 9 | 97.17 | 0.12 | 2.22 | 0.49 | | | | |
| Formulation 10 | 98.07 | 0.12 | 1.32 | 0.49 | | | | |
| Formulation 11 | 97.66 | 0.02 | 1.83 | 0.49 | | | | |
| Formulation 12 | 97.36 | 0.32 | 1.83 | 0.49 | | | | |
| Formulation 13 | 97.95 | 0.12 | 1.83 | | 0.1 | | | |
| Formulation 14 | 97.05 | 0.12 | 1.83 | | 1 | | | |
| Formulation 15 | 97.95 | 0.12 | 1.83 | | | 0.1 | | |
| Formulation 16 | 97.05 | 0.12 | 1.83 | | | 1 | | |
| Formulation 17 | 97.95 | 0.12 | 1.83 | | | | 0.1 | |
| Formulation 18 | 97.05 | 0.12 | 1.83 | | | | 1 | |
| Formulation 19 | 97.68 | | 1.83 | 0.49 | | | | |
| Formulation 20 | 99.39 | 0.12 | | 0.49 | | | | |
| Formulation 21 | 97.56 | 0.12 | | 0.49 | | | | |
| Formulation 22 | 98.49 | 0.12 | | 0.49 | | | | |
| Formulation 23 | 97.17 | 0.12 | | 0.49 | | | | |
| Formulation 24 | 98.05 | 0.12 | | | | | | |
| Formulation 25 | 97.56 | 0.12 | | 0.49 | | | | |
| Formulation 26 | 98.49 | 0.12 | | 0.49 | | | | |
| Formulation 27 | 97.17 | 0.12 | | 0.49 | | | | |
| Formulation 28 | 98.05 | 0.12 | | | | | | |
| | | | | | | | (C) | |

TABLE-continued

Experimental Solid Formulation Specifics, Qualitative Particle Screening of the Formulated Product, and Foam Inhibition Data

|  | Nitrilotriacetic acid (CAS: 139-13-9) | Ascorbic Acid | Acetic Acid (CAS: 64-1 9-7) | 80% Sodium Dihexyl sulphosuccinate Solution (g) | Sodium lauryl sulfate (CAS: 151-21-3) | Sodium Laureth-4 phosphate (CAS: 42612-52-2) | Sodium Stearate (CAS: 822-16-2) |
|---|---|---|---|---|---|---|---|
| (A) | 1.83 |  |  |  |  |  | (B) |
|  | 0.9 |  |  |  |  |  |  |
|  | 2.22 |  |  |  |  |  |  |
|  | 1.83 |  |  |  |  |  |  |
|  |  | 1.83 |  |  |  |  |  |
|  |  | 0.9 |  |  |  |  |  |
|  |  | 2.22 |  |  |  |  |  |
|  |  | 1.83 |  |  |  |  |  |
|  |  |  | (D) |  |  |  |  |

|  | Pass through 5 mm screen | Amount of Solid Product to be Dissolved (g) | Water Used for foam test(mL) | Foaming Agent (g) | % Foam Inhibition |
|---|---|---|---|---|---|
| (B) | yes | 0.5 | 100 | 0.15 | 4% |
|  | yes | 0.5 | 100 | 0.15 | 100% |
|  | yes | 0.5 | 100 | 0.15 | 93% |
|  | yes | 0.5 | 100 | 0.15 | 49% |
|  | yes | 0.5 | 100 | 0.15 | 70% |
|  | yes | 0.5 | 100 | 0.15 | 91% |
|  | yes | 0.5 | 100 | 0.15 | 100% |
|  | yes | 0.5 | 100 | 0.15 | 86% |
|  | yes | 0.5 | 100 | 0.15 | 88% |
|  | yes | 0.5 | 100 | 0.15 | 88% |
|  | yes | 0.5 | 100 | 0.15 | 90% |
|  | yes | 0.5 | 100 | 0.15 | 100% |
|  | yes | 0.5 | 100 | 0.15 | 99% |
|  | yes | 0.5 | 100 | 0.15 | 89% |
|  | yes | 0.5 | 100 | 0.15 | 94% |
|  | yes | 0.5 | 100 | 0.15 | 82% |
|  | yes | 0.5 | 100 | 0.15 | 88% |
|  | yes | 0.5 | 100 | 0.15 | 83% |
|  | yes | 0.5 | 100 | 0.15 | 90% |
|  | yes | 0.5 | 100 | 0.15 | 88% |
|  | yes | 0.5 | 100 | 0.15 | 82% |
|  | yes | 0.5 | 100 | 0.15 | 91% |
|  | yes | 0.5 | 100 | 0.15 | 78% |
|  | yes | 0.5 | 100 | 0.15 | 92% |
|  | yes | 0.5 | 100 | 0.15 | 13% |
|  | yes | 0.5 | 100 | 0.15 | 88% |
|  | yes | 0.5 | 100 | 0.15 | 82% |
|  | yes | 0.5 | 100 | 0.15 | 80% |
|  | yes | 0.5 | 100 | 0.15 | 10% |
|  |  |  | (E) |  |  |

(C)

|  | Nitrilotriacetic acid | Ascorbic Acid | Acetic Acid | 80% Sodium Dihexyl sulphosuccinate Solution (g) | Sodium lauryl sulfate | Sodium Laureth-4 phosphate | Sodium Stearate |
|---|---|---|---|---|---|---|---|
| Formulation 29 | 97.58 |  | 1.83 | 0.49 |  |  |  |
| Formulation 30 | 97.42 |  | 1.83 | 0.49 |  |  |  |
| Formulation 31 | 59.54 |  | 1.83 | 0.49 |  |  |  |
| Formulation 32 | 98.07 |  | 1.83 |  |  |  |  |
| Formulation 33 | 97.56 | 0.12 |  | 0.49 |  |  |  |
| Formulation 34 | 98.49 | 0.12 |  | 0.49 |  |  |  |
| Formulation 35 | 97.17 | 0.12 |  | 0.49 |  |  |  |
| Formulation 36 | 98.05 | 0.12 |  |  |  |  |  |
| Formulation 37 | 97.56 |  | 1.83 | 0.49 |  |  |  |
| Formulation 38 | 97.36 |  | 1.83 | 0.49 |  |  |  |
| Formulation 39 | 97.66 |  | 1.83 | 0.49 |  |  |  |
| Formulation 40 | 98.05 |  | 1.83 |  |  |  |  |

TABLE-continued

Experimental Solid Formulation Specifics, Qualitative Particle Screening of the Formulated Product, and Foam Inhibition Data

| | | | | |
|---|---|---|---|---|
| Formulation 41 | 97.56 | | 1.83 | 0.49 |
| Formulation 42 | 97.36 | | 1.83 | 0.49 |
| Formulation 43 | 97.66 | | 1.83 | 0.49 |
| Formulation 44 | 98.05 | | 1.83 | |
| Formulation 45 | 97.56 | | 1.83 | 0.49 |
| Formulation 46 | 97.36 | | 1.83 | 0.49 |
| Formulation 47 | 97.66 | | 1.83 | 0.49 |
| Formulation 48 | 98.05 | | 1.83 | |
| Negative Control | | | | |
| Baseline Control 1 | 97.56 | | 1.83 | 0.49 |
| Baseline Control 2 | 97.56 | 0.12 | | 0.49 |
| Baseline Control 3 | 97.56 | 0.12 | 1.83 | 0.49 |
| Positive Control 1 | | | | 0.49 |
| Positive Control 2 | | | | | 0.49 |
| Positive Control 3 | | | | | 0.49 |
| Positive Control 4 | | | | | | 0.49 |

(F)

(D)

| (A) | | | | (B) |
|---|---|---|---|---|
| | | 0.1 | | |
| | | 0.26 | | |
| | | 38.14 | | |
| | | 0.1 | | |
| | 1.83 | | | |
| | 0.9 | | | |
| | 2.22 | | | |
| | 1.83 | | | |
| | | | 0.12 | |
| | | | 0.32 | |
| | | | 0.02 | |
| | | | 0.12 | |
| | | | | 0.12 |
| | | | | 0.32 |
| | | | | 0.02 |
| | | | | 0.12 |
| | | | | | 0.12 |
| | | | | | 0.32 |
| | | | | | 0.02 |
| | | | | | 0.12 |

(E)

| (B) | | | | | |
|---|---|---|---|---|---|
| | yes | 0.5 | 100 | 0.15 | 75% |
| | yes | 0.5 | 100 | 0.15 | 77% |
| | yes | 0.5 | 100 | 0.15 | 72% |
| | yes | 0.5 | 100 | 0.15 | 3% |
| | yes | 0.5 | 100 | 0.15 | 81% |
| | yes | 0.5 | 100 | 0.15 | 71% |
| | yes | 0.5 | 100 | 0.15 | 88% |
| | yes | 0.5 | 100 | 0.15 | 9% |
| | yes | 0.5 | 100 | 0.15 | 65% |
| | yes | 0.5 | 100 | 0.15 | 69% |
| | yes | 0.5 | 100 | 0.15 | 54% |
| | yes | 0.5 | 100 | 0.15 | 11% |
| | yes | 0.5 | 100 | 0.15 | 65% |
| | yes | 0.5 | 100 | 0.15 | 69% |
| | yes | 0.5 | 100 | 0.15 | 23% |
| | yes | 0.5 | 100 | 0.15 | 0% |
| | yes | 0.5 | 100 | 0.15 | 56% |
| | yes | 0.5 | 100 | 0.15 | 68% |

TABLE-continued

Experimental Solid Formulation Specifics, Qualitative Particle Screening of the Formulated Product, and Foam Inhibition Data

| | | | | |
|---|---|---|---|---|
| yes | 0.5 | 100 | 0.15 | 26% |
| yes | 0.5 | 100 | 0.15 | 3% |
| n/a | | 100 | 0.15 | 0% |
| no | 0.5 | 100 | 0.15 | 35% |
| no | 0.5 | 100 | 0.15 | 26% |
| no | 0.5 | 100 | 0.15 | 96% |
| n/a | | 100 | 0.15 | 100% |
| n/a | | 100 | 0.15 | 93% |
| n/a | | 100 | 0.15 | 50% |
| n/a | | 100 | 0.15 | 66% |

The results of extensive testing are shown on the Table. In addition to the control formulation, the negative control and groups of three and four positive controls, a total of 48 formulations were tested and evaluated in terms of the percent of foam inhibition. In general, the inhibition was deemed to a successful defoaming experience if the percentage shown in the last column of the Table was preferably at least 70 percent. It is preferable that the percentage be at least 80 percent.

With regard to citric acid, in those formulations where it was employed, it was employed in the amount of 1.83% (m/m) with the exception of several which departed from this range.

The formulations in general varied as to the particular defoamer employed. With the emulsified silicone defoamer when employed (with the exception of formulation 6) being present in the amount of 0.49% (m/m). The other defoamers which appear in the following three columns were each employed with several formulations.

Considering the last five columns on the right side of the Table, except for some of the baseline controls, the granular materials pass through a 5 mm screen. The amount of solid product to be dissolved was 0.50% (m/m). The amount of water employed in the test was 100 milliliters with 0.15% (m/m) of the specific foaming agent being employed. The final column lists the foam inhibition results of the various combinations.

Without analyzing each constituent component of the tests, several observations will be made. More specifically, formulations 7 through 12 produced foam inhibition ranging from 86 to 100 percent. Formulation 20, which eliminated the citric acid from the formulation, produced 82 percent foam inhibition. Baseline control formulation 1 eliminated the surfactant and had a foam suppression of 35 percent. Baseline control 2 eliminated the citric acid and had a foam inhibition of 26 percent. Baseline controls 1-3 were not successful in that the first two produced large agglomerates and the third exhibited much lower volume metric density per gram of material making it unfavorable for commercial packaging. The defoamers shown in columns 5 through 7 of the Table produced a variety of results depending upon the amount of a particular defoamer employed. Formulation 2 produced a foam inhibition of 93 percent, while formulation 3 produced a foam inhibition of 49 percent and formulation 4 produced a foam inhibition of 70 percent. Formulations 13 through 18 used in combination with two different defoamers and two different quantities of defoamer showed inhibitions ranging from 83 percent to 89 percent with those employing the greater weight of defoamer 1.00% (m/m) producing a better result than those using the lower weight 0.10% (m/m).

The tests of formulations 20 through 23 show the use of no citric acid and two defoamers with the second being employed with different weights. These resulted in inhibition percentages ranging from 78 to 92.

Detailed examples of the preparation of certain formulations will now be considered.

Control Formulation with No Defoamer

This formulation had the ingredients shown in the Table. It was prepared in the following manner. To a stainless-steel tumble blender was added 97.56% (m/m) of Ammonium Sulfate (less than 3 mm in particle diameter) under ambient humidity and temperature conditions with 1.83% (m/m) of citric acid being added directly on top of the ammonium sulfate. The tumbler was turned on and mixed at 45 rpm and mixed for 5 min at clockwise rotation. The motor was stopped and immediately switched to counterclockwise rotation for an additional 5 minutes. The mixer was again stopped before 0.12% (m/m) of an 80% active aqueous solution of sodium dioctyl sulphosuccinate was added. The mixture was tumbled for 5 minutes clockwise and 5 minutes counterclockwise. The material which was the final granulated product was removed from the tumbler and delivered to a plastic container which was sealed and stored at room temperature.

Defoamer Containing Experimental Formulation 1

In this formulation, 0.49% (m/m) of an emulsified silicone defoamer composed of: 55% (m/m) of polydimethylsiloxane CAS:63148-62-9, 3% m/m silicon dioxide (CAS: 67762-90-7), and 42% m/m polyether-modified polydimethylsiloxane (CAS: 64365-23-7) was slowly added to a separate vessel containing 0.12% (m/m) of an 80% active aqueous solution of sodium dioctyl sulphosuccinate. This mixture was stirred at 100 rpm for 5 minutes. To a stainless-steel tumble blender was added 97.56% (m/m) of Ammonium Sulfate (less than 3 mm in particle diameter) under ambient humidity and temperature conditions. The vessel was stirred at 85 rpm before adding the liquid mixture of emulsified defoamer and aqueous sodium dioctyl sulphosuccinate into the lower port of the tumbler. The mixture was immediately stirred for 10 minutes at 80 rpm clockwise and 5 minutes counterclockwise. The mixer was stopped and 1.83% (m/m) of citric acid was added directly on top of the ammonium sulfate blend. The tumbler was turned on and mixed at 65 rpm and mixed for 5 min at clockwise rotation. The motor was stopped and immediately switched to counterclockwise rotation for an additional 5 minutes. The mixture was tumbled for 5 minutes clockwise and 5 minutes counterclockwise. The material which was the final granulated product was removed from the tumbler and stored in a sealed plastic container at room temperature.

Defoamer Containing Experimental Formulation 2

In this formulation, 0.49% (m/m) of polydimethylsiloxane (CAS:63148-62-97) was slowly added to a separate vessel containing 0.12% (m/m) of an 80% active aqueous solution of sodium dioctyl sulphosuccinate. This mixture was stirred at 100 rpm for 5 minutes. To a stainless-steel tumble blender was added 97.56% (m/m) of Ammonium Sulfate (less than 3 mm in particle diameter) under ambient humidity and temperature conditions. The vessel was stirred at 85 rpm before adding by the liquid mixture of emulsified defoamer and aqueous sodium dioctyl sulphosuccinate into the lower port of the tumbler. The mixture was immediately stirred for 10 minutes at 80 rpm clockwise and 5 minutes counterclockwise. The mixer was stopped and 1.83% (m/m) of citric acid was added directly on top of the ammonium sulfate blend. The tumbler was turned on and mixed at 65 rpm and mixed for 5 min at clockwise rotation. The motor was stopped and immediately switched to counterclockwise rotation for an additional 5 minutes. The mixture was tumbled for 5 minutes clockwise and 5 minutes counterclockwise. The material which was the final granulated product was removed from the tumbler and delivered to a plastic container which was sealed and stored at room temperature.

Defoamer Containing Experimental Formulation 3

In this formulation, 0.49% (m/m) of pure silicon dioxide (CAS: 67762-90-7) was slowly added to a separate vessel containing 0.12% (m/m) of an 80% active aqueous solution of sodium dioctyl sulphosuccinate. This mixture was stirred at 100 rpm for 5 minutes. To a stainless-steel tumble blender was added 97.56% (m/m) of Ammonium Sulfate (less than 3 mm in particle diameter) under ambient humidity and temperature conditions. The vessel was stirred at 85 rpm before adding by the liquid mixture of emulsified defoamer and aqueous sodium dioctyl sulphosuccinate into the lower port of the tumbler. The mixture was immediately stirred for 10 minutes at 80 rpm clockwise and 5 minutes counterclockwise. The mixer was stopped and 1.83% (m/m) of citric acid was added directly on top of the ammonium sulfate blend. The tumbler was turned on and mixed at 65 rpm and mixed for 5 min at clockwise rotation. The motor was stopped and immediately switched to counterclockwise rotation for an additional 5 minutes. The mixture was tumbled for 5 minutes clockwise and 5 minutes counterclockwise. The material which was the final granulated product was removed from the tumbler and delivered to a plastic container which was sealed and stored at room temperature.

Defoamer Containing Experimental Formulation 4

In this formulation, 0.49% (m/m) of polyether-modified polydimethylsiloxane (CAS: 64365-23-7) was slowly added to a separate vessel containing 0.12% (m/m) of an 80% active aqueous solution of sodium dioctyl sulphosuccinate. This mixture was stirred at 100 rpm for 5 minutes. To a stainless-steel tumble blender was added 97.56% (m/m) of Ammonium Sulfate (less than 3 mm in particle diameter) under ambient humidity and temperature conditions. The vessel was stirred at 85 rpm before adding by the liquid mixture of emulsified defoamer and aqueous sodium dioctyl sulphosuccinate into the lower port of the tumbler. The mixture was immediately stirred for 10 minutes at 80 rpm clockwise and 5 minutes counterclockwise. The mixer was stopped and 1.83% (m/m) of citric acid was added directly on top of the ammonium sulfate blend. The tumbler was turned on and mixed at 65 rpm and mixed for 5 min at clockwise rotation. The motor was stopped and immediately switched to counterclockwise rotation for an additional 5 minutes. The mixture was tumbled for 5 minutes clockwise and 5 minutes counterclockwise. The material which was the final granulated product was removed from the tumbler and delivered to a plastic container which was sealed and stored at room temperature.

Defoamer Containing Experimental Formulation 25

In this formulation, 0.49% (m/m) of an emulsified silicone defoamer (composed of: 55% (m/m) of polydimethylsiloxane (CAS:63148-62-9), 3% (m/m) silicon dioxide (CAS: 67762-90-7), and 42% (m/m) polyether-modified polydimethylsiloxane CAS: 64365-23-7) was slowly added to a separate vessel containing 0.12% (m/m) of an 80% active aqueous solution of sodium dioctyl sulphosuccinate. This mixture was stirred at 100 rpm for 5 minutes. To a stainless-steel tumble blender was added 97.56% (m/m) of Ammonium Sulfate (less than 3 mm in particle diameter) under ambient humidity and temperature conditions. The vessel was stirred at 85 rpm before adding the liquid mixture of emulsified defoamer and aqueous sodium dioctyl sulphosuccinate into the lower port of the tumbler. The mixture was immediately stirred for 10 minutes at 80 rpm clockwise and 5 minutes counterclockwise. The mixer was stopped and 1.83% (m/m) of ascorbic acid (CAS: 50-81-7) was added directly on top of the ammonium sulfate blend. The tumbler was turned on and mixed at 65 rpm and mixed for 5 min at clockwise rotation. The motor was stopped and immediately switched to counterclockwise rotation for an additional 5 minutes. The mixture was tumbled for 5 minutes clockwise and 5 minutes counterclockwise. The material which was the final granulated product was removed from the tumbler and delivered to a plastic container which was sealed and stored at room temperature.

Defoamer Containing Experimental Formulation 29

In this formulation, 0.49% (m/m) of an emulsified silicone defoamer (composed of: (m/m) of polydimethylsiloxane CAS:63148-62-9, 3% m/m silicon dioxide CAS: 67762-90-7, and 42% (m/m) polyether-modified polydimethylsiloxane CAS: 64365-23-7) was slowly added to a separate vessel containing 0.12% (m/m) of an 80% active aqueous solution of sodium dihexyl sulphosuccinate (CAS: 3006-15-3). This mixture was stirred at 100 rpm for 5 minutes. To a stainless-steel tumble blender was added 97.56% (m/m) of Ammonium Sulfate (less than 3 mm in particle diameter) under ambient humidity and temperature conditions. The vessel was stirred at 85 rpm before adding the liquid mixture of emulsified defoamer and aqueous sodium dioctyl sulphosuccinate into the lower port of the tumbler. The mixture was immediately stirred for 10 minutes at 80 rpm clockwise and 5 minutes counterclockwise. The mixer was stopped and 1.83% (m/m) of citric acid was added directly on top of the ammonium sulfate blend. The tumbler was turned on and mixed at 65 rpm and mixed for 5 min at clockwise rotation. The motor was stopped and immediately switched to counterclockwise rotation for an additional 5 minutes. The mixture was tumbled for 5 minutes clockwise and 5 minutes counterclockwise. The material which was the final granulated product was removed from the tumbler and delivered to a plastic container which was sealed and stored at room temperature.

As exemplified by the foregoing, the present invention provides a unique dry, free-flowing solid adjuvant for use with pesticides was formulated with an ammonium sulfate and with a liquid defoamer coated thereon that exhibited excellent foam prevention in standardized tests.

The negative control not unexpectedly, provided 0 percent inhibition. In testing a formulations 1 through 48, all of the coated granules passed through a 5 mm screen and the amount of solid product to be dissolved equaled 0.50%

(m/m). the amount of water used was 100 milliliters. Each formulation was manufactured to 100% (m/m) so that mass in grams corresponded to the (% m/m). In all of the tests, the foaming agent employed was in the quantity of 0.15% (m/m).

For example, the solution of the negative control generated 107 mL of foam under the above foam generating stress conditions. The solid adjuvant formulation with no defoamer, when dissolved in water, and mixed with the foaming agent, produced 101 mL of foam, resulting in a 6% inhibition in the volume of foam generated.

Considering formulations 29 through 31, wherein different amounts of 80 percent sodium dioctyl sulphosuccinate solution were employed, the inhibition percentage ranged from 72 to 75 percent. When the defoamer was eliminated, the inhibition percentage dropped to 3 percent in formulation 32.

Formulations 37 through 39 wherein the percentage of surfactant sodium lauryl sulfate varied, the percentage inhibition range from 54 percent to 65 percent and when the defoamer was not used, inhibition dropped to 11 percent.

Considering formulations 41 through 43 with varying percentages of the surfactant sodium laureth-4 phosphate being employed, the percentage inhibition ranged from 23 to 69 percent. When the amount of surfactant dropped from 0.0 to 0.02% (m/m) in formulation 44, where the defoamer was not used, the inhibition dropped to 0 percent.

Considering formulations 45 through 47 wherein the surfactant sodium stearate was used in different percentage, the inhibition range varied from 26 percent to 56 percent with there being a definite correlation between the quantity of the surfactant employed and the percentage inhibition. In formulation 48 which involves no defoamer and the lowest quantity of the surfactant, the inhibition was 3 percent.

Baseline Control 1 did not employ the surfactant 80 percent sodium dioctyl sulphosuccinate solution and produced an inhibition percentage of 35 percent. Baseline Control 2 did not employ citric acid and resulted in a 26 percent inhibition. Baseline Controls 1 and 2 did not result in a granular, free-flowing product. The material clumped into large agglomerates which could be broken into smaller units with aggressive mechanical manipulation.

Baseline Control 3 employed ammonium sulfate, the surfactant, citric acid and emulsified silicone defoamer and produced a 96 percent inhibition. Baseline Control 3 utilized ammonium sulfate that ranged from 3 mm to 250 mm in particle size. The material did not clump, but exhibited lower volumetric density per 1% (m/m) of material, making it unfavorable for traditional commercial packaging. In testing for undesired agglomeration, the experimental formulations were passed through a 5 mm sieve with 10 seconds of general shaking. If all the material passed through then the material is deemed as free-flowing with no unwanted agglomeration.

Positive Controls 1 through 4 each employed one of the defoaming agents in the amount of 0.49% (m/m) without employing ammonium sulfate, 80 percent sodium dioctyl sulphosuccinate solution and citric acid. They produced, respectively, inhibitions of 93 percent, 50 percent and 66 percent.

The negative control employed was 100 ml of water with 0.195% (m/m) of a 60 percent active cocoamine oxide surfactant which is specifically designed for high foam buildup.

Positive Control 1 is 100 milliliters of water with 0.19% (m/m) of 60 percent active cocoamine oxide surfactant and 0.49% (m/m) of emulsified silicone defoamer.

Positive Control 2 was 100 milligram of water with 0.195% (m/m) of 60 percent active cocoamine oxide surfactant and 0.49% (m/m) of polydimethyl siloxane.

Positive Control 3 was 100 ml of water with 0.195% (m/m) of 60 percent active cocoamine oxide surfactant and 0.49% (m/m) of pure silicon dioxide.

In measuring foam inhibition, the solid adjuvant formulation was dissolved in room temperature tap water in 1 L graduated cylinder and stirred for 10 revolutions with a mixing paddle by hand. The foaming agent was added and the solution was mixed using a mechanical Dispermat according to the previously described conditions. The volume of foam above the liquid interface was measured 1 minute after the mixer was turned off In a preferred embodiment, an emulsified silicone defoamer was formulated at 0.5% (m/m) into a solid product containing: 97.07% (m/m) Ammonium Sulfate (<3 mm diameter), 0.12% (m/m) of a 80% Sodium Dioctyl sulphosuccinate solution, 1.83% (m/m) citric acid.

Whereas particular embodiments of the invention have been disclosed herein for purposes of illustration, it will be appreciated by those skilled in the art that numerous variations of the details may be made without departing from the invention as described in the appended claims of the specification.

What is claimed is:

1. A granulated adjuvant comprising
   granulated ammonium sulfate and a mixture of a defoamer, an anionic surfactant, and an organic acid, and
   said mixture being a coating on said ammonium sulfate granules;
   wherein said defoamer is emulsified silicone defoamer present in an amount of about 0.49 to 1.00% (m/m);
   wherein said anionic surfactant is 80 percent sodium dioctyl sulphosuccinate;
   wherein said surfactant is present in an amount of about 0.02 to 0.12% (m/m);
   wherein said organic acid is citric acid;
   wherein said citric acid is present in an amount of about 1.83% (m/m) based on total granule weight;
   wherein said ammonium sulfate granules are present in an amount of about 97.05 to 97.56% (m/m); and
   wherein said ammonium sulfate granules have a dimension of about 3.3 mm to 3.5 mm.

2. The granular adjuvant of claim 1 comprising,
   said granulated adjuvant being water soluble.

3. The granular adjuvant of claim 2 comprising,
   said granulated adjuvant being structured to be dissolved in water at ambient temperature.

4. The granular adjuvant of claim 1 comprising,
   said granulated adjuvant having a maximum dimension of about 5 mm.

5. The granular adjuvant of claim 1 comprising,
   said coating being self-adhered to said ammonium sulfate granules.

6. The granular adjuvant of claim 5 including,
   said coating being continuous.

7. A granulated adjuvant comprising,
   ammonium sulfate granules coated with a mixture of (a) emulsified silicone defoamer, (b) 80 percent sodium dioctyl sulphosuccinate solution, and (c) citric acid;
   wherein said ammonium sulfate granules are present in an amount of about 97.05 to 97.56% (m/m);
   wherein said 80 percent sodium dioctyl sulphosuccinate solution is present in an amount of about 0.02 to 0.12% (m/m);

wherein said citric acid is present in an amount of about 1.83% (m/m) based on total granule weight;
wherein said defoamer is present in an amount of about 0.49 to 1.0% (m/m); and
wherein said ammonium sulfate granules have a dimension of about 3.3 mm to 3.5 mm.

* * * * *